US012633069B1

(12) United States Patent
Oduoroggorremassin

(10) Patent No.: US 12,633,069 B1
(45) Date of Patent: May 19, 2026

(54) DIALYSIS TRAINING USING ARTIFICIAL INTELLIGENCE AND AUGMENTED REALITY

(71) Applicant: Daniel Oduoroggorremassin,
Indianapolis, IN (US)

(72) Inventor: Daniel Oduoroggorremassin,
Indianapolis, IN (US)

( * ) Notice: Subject to any disclaimer, the term of this patent is extended or adjusted under 35 U.S.C. 154(b) by 134 days.

(21) Appl. No.: 18/796,413

(22) Filed: Aug. 7, 2024

(51) Int. Cl.
| | |
|---|---|
| *G06T 19/00* | (2011.01) |
| *G02B 27/01* | (2006.01) |
| *G09B 5/02* | (2006.01) |
| *G09B 23/28* | (2006.01) |
| *G09B 23/30* | (2006.01) |

(52) U.S. Cl.
CPC .......... *G06T 19/006* (2013.01); *G02B 27/017* (2013.01); *G09B 5/02* (2013.01); *G09B 23/28* (2013.01); *G09B 23/30* (2013.01)

(58) Field of Classification Search
CPC ...... G06T 19/006; G02B 27/017; G09B 5/02; G09B 23/28; G09B 23/30
See application file for complete search history.

(56) References Cited

U.S. PATENT DOCUMENTS

| | | | | |
|---|---|---|---|---|
| 10,636,323 | B2 * | 4/2020 | Buras ..................... | G09B 5/065 |
| 11,031,128 | B2 | 6/2021 | Plahey et al. | |

| | | | | |
|---|---|---|---|---|
| 11,694,577 | B2 * | 7/2023 | Sloat .................... | G09B 23/303 |
| | | | | 434/268 |
| D1,009,865 | S | 1/2024 | Chen | |
| 11,881,289 | B2 | 1/2024 | White | |
| 2014/0099617 | A1 * | 4/2014 | Tallman, Jr. ......... | G09B 23/303 |
| | | | | 434/262 |
| 2023/0129708 | A1 | 4/2023 | Stone | |
| 2023/0237929 | A1 * | 7/2023 | Sloat .................. | A61M 1/1621 |
| | | | | 434/262 |
| 2023/0274659 | A1 * | 8/2023 | Adi ........................ | G06V 10/74 |
| 2024/0029367 | A1 * | 1/2024 | Golenberg ............. | G09B 23/28 |

FOREIGN PATENT DOCUMENTS

| | | |
|---|---|---|
| WO | 2014113186 | 7/2014 |

* cited by examiner

*Primary Examiner* — Cory A Almeida
(74) *Attorney, Agent, or Firm* — Kyle A. Fletcher, Esq.

(57) ABSTRACT

The dialysis training using artificial intelligence and augmented reality is an artificial intelligence training device. The dialysis training using artificial intelligence and augmented reality is configured for use in training a trainee. The dialysis training using artificial intelligence and augmented reality uses a tactical artificial intelligence method to generate an augmented reality for the trainee. The dialysis training using artificial intelligence and augmented reality incorporates a simulated arm structure, an augmented reality structure, and a virtual environment. The simulated arm structure is a puppet that simulates the arm of a hypothetical patient. The augmented reality structure is the physical structure that presents a virtual environment that overlays the simulated arm structure. The virtual environment overlays images that are presented over the simulated arm to simulate the dialysis process for the trainee.

9 Claims, 3 Drawing Sheets

BP: 120/70
PULSE: 72 ⎤—131
RESP: 17 ⎦

101

111

132

112

103—⎡131
    ⎣132

DIALYSIS TRAINING USING ARTIFICIAL INTELLIGENCE AND AUGMENTED REALITY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The dialysis training using artificial intelligence and aug-mented reality is an artificial intelligence device. The dialy-sis training using artificial intelligence and augmented real-ity is a training device. The dialysis training using artificial intelligence and augmented reality is configured for use in training a trainee. The dialysis training using artificial intel-ligence and augmented reality uses a tactical artificial intel-ligence method to generate an augmented reality for the trainee. The dialysis training using artificial intelligence and augmented reality comprises a simulated arm structure, an augmented reality structure, and a virtual environment. The simulated arm structure is a puppet that simulates the arm of a hypothetical patient. The augmented reality structure is the physical structure that presents a virtual environment that overlays the simulated arm structure. The virtual environ-ment overlays images that are presented over the simulated arm to simulate the dialysis process for the trainee.

These together with additional objects, features and advantages of the dialysis training using artificial intelli-gence and augmented reality will be readily apparent to those of ordinary skill in the art upon reading the following detailed description of the presently preferred, but nonethe-less illustrative, embodiments when taken in conjunction with the accompanying drawings.

In this respect, before explaining the current embodiments of the dialysis training using artificial intelligence and augmented reality in detail, it is to be understood that the dialysis training using artificial intelligence and augmented reality is not limited in its applications to the details of construction and arrangements of the components set forth in the following description or illustration. Those skilled in the art will appreciate that the concept of this disclosure may be readily utilized as a basis for the design of other struc-tures, methods, and systems for carrying out the several purposes of the dialysis training using artificial intelligence and augmented reality.

It is therefore important that the claims be regarded as including such equivalent construction insofar as they do not depart from the spirit and scope of the dialysis training using artificial intelligence and augmented reality. It is also to be understood that the phraseology and terminology employed herein are for purposes of description and should not be regarded as limiting.

BRIEF DESCRIPTION OF DRAWINGS

The accompanying drawings, which are included to pro-vide a further understanding of the invention are incorpo-rated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodi-ments of the application and uses of the described embodi-ments. As used herein, the word "exemplary" or "illustra-tive" means "serving as an example, instance, or illustration." Any implementation described herein as "exemplary" or "illustrative" is not necessarily to be con-strued as preferred or advantageous over other implemen-tations. All of the implementations described below are exemplary implementations provided to enable persons skilled in the art to practice the disclosure and are not intended to limit the scope of the appended claims. Further-more, there is no intention to be bound by any expressed or implied theory presented in the preceding technical field, background, brief summary or the following detailed description.

Figure 1:
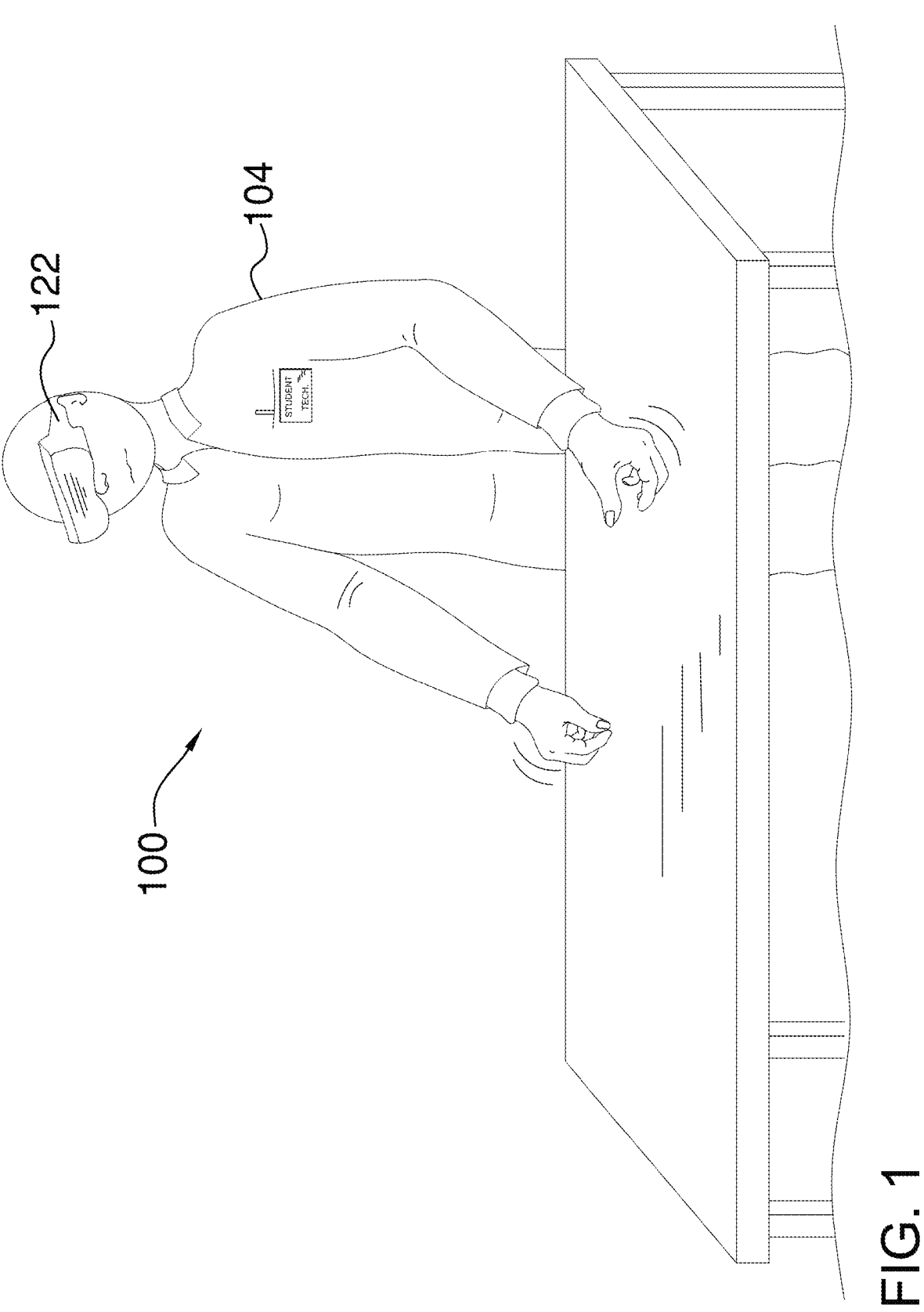
FIG. 1 is an in-use view of an embodiment of the disclosure.
Figure 2:
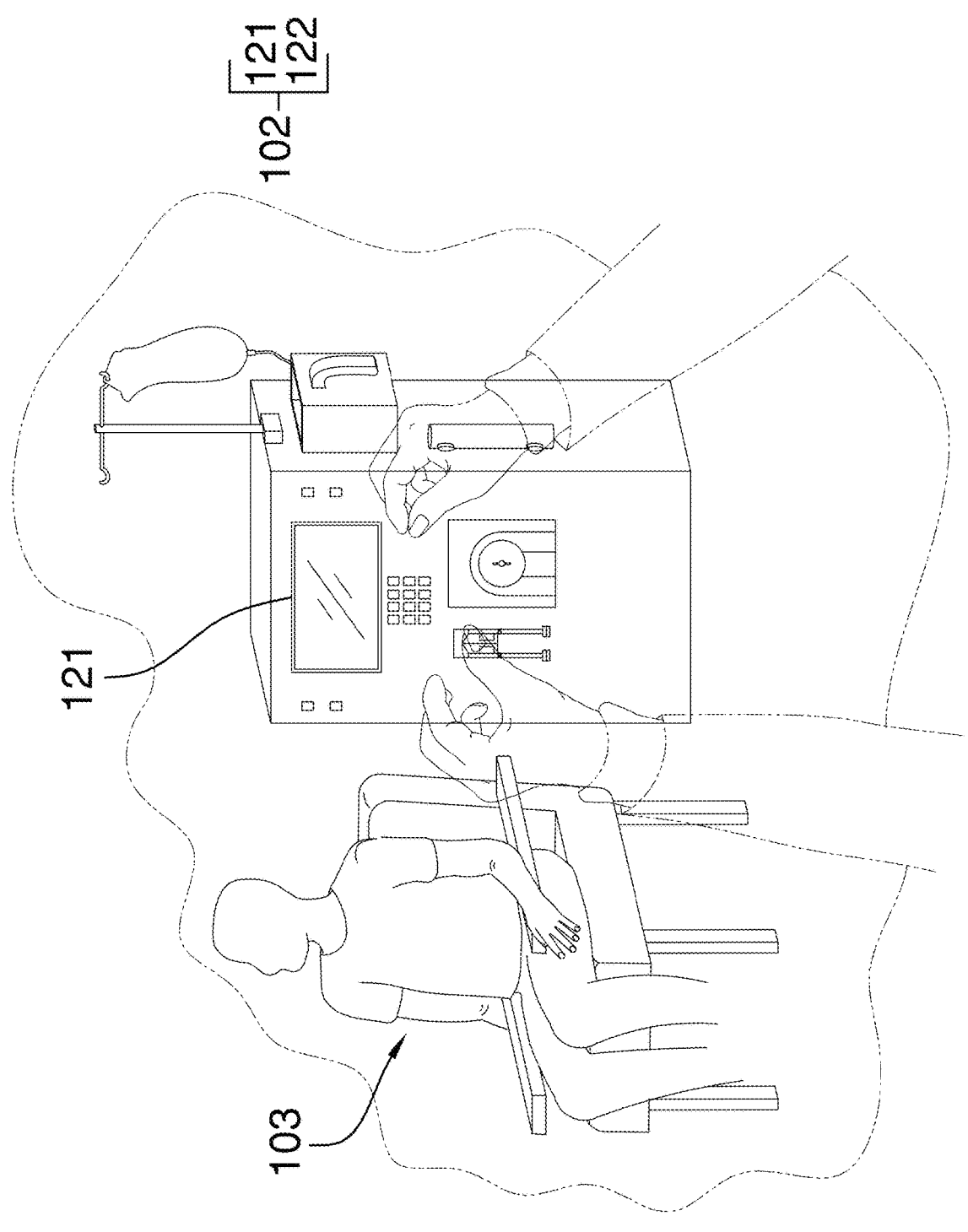
FIG. 2 is an in-use view of an embodiment of the disclosure.
Figure 3:
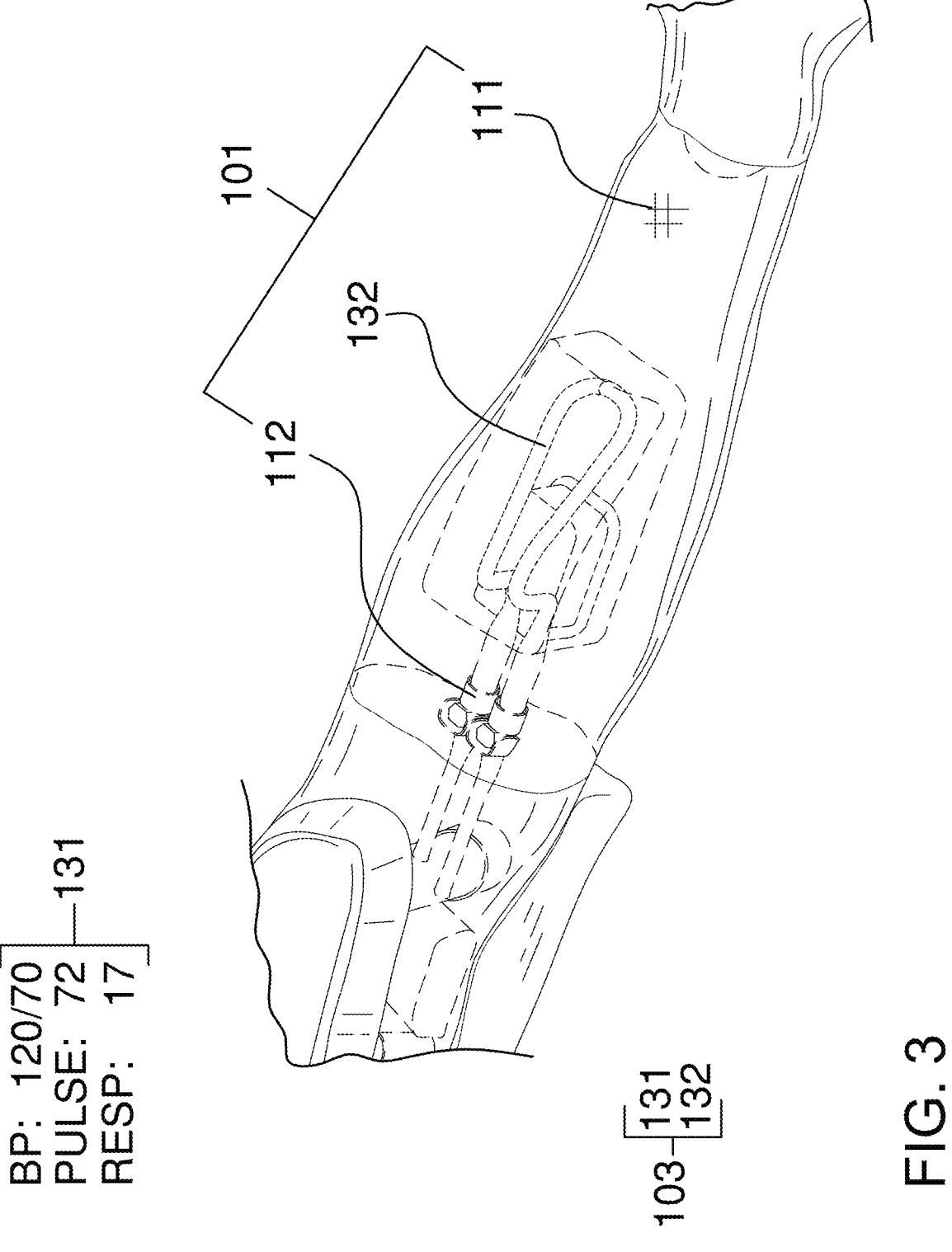
FIG. 3 is a detail view of an embodiment of the disclosure.

Detailed reference will now be made to one or more potential embodiments of the disclosure, which are illus-trated in FIGS. 1 through 3.

The dialysis training using artificial intelligence and aug-mented reality 100 (hereinafter invention) is an artificial intelligence device. The invention 100 is a training device. The invention 100 is configured for use in training a trainee 104. The invention 100 uses a tactical artificial intelligence method to generate an augmented reality for the trainee 104. The invention 100 comprises a simulated arm structure 101, an augmented reality structure 102, and a virtual environ-ment 103. The simulated arm structure 101 is a puppet that simulates the arm of a hypothetical patient. The augmented reality structure is the physical structure that overlays a virtual environment 103 on the simulated arm structure 101. The virtual environment 103 overlays images that are pre-sented over the simulated arm to simulate the dialysis process for the trainee 104.

The trainee 104 is an individual who is designated to use the services of the invention 100. The trainee 104 is taught how to insert a catheter into the fistula of a patient such blood can be exchanged between the patient and dialysis machine.

The simulated arm structure 101 is a puppet. The form factor of the simulated arm structure 101 simulates the arm of a patient. The simulated arm structure 101 forms the physical structure that simulates the tactile portions of the insertion of the catheter structure. The catheter structure forms the fluidic connection between the fistula of the patient and a dialysis machine. The simulated arm structure 101 comprises a simulated skin structure 111 and a simulated fistula structure 112.

The simulated skin structure 111 forms the exterior surface of the simulated arm structure 101. The simulated skin structure 111 is an elastic structure. The simulated skin structure 111 is formed to simulate the mechanical structure of skin. The simulated skin structure 111 presents the trainee with a barrier that is similar to the skin of a patient. The simulated skin structure 111 trains the trainee 104 in inserting the catheter through the skin of a patient.

The simulated fistula structure 112 emulates the fistula of a patient. The fistula is the biological structure that the trainee 104 targets with the catheter. The fistula forms the point of fluidic contact between the patient and the catheter. The simulated fistula structure 112 the fistula is a mechanical structure that maintains a fluid flow and pressure that simulates the blood flow of a patient through the fistula.

The augmented reality structure 102 is an artificial intelligence device. The augmented reality structure 102 implements a tactical artificial intelligence system. The augmented reality structure 102 forms the visual stimuli that integrates the virtual environment 103 with the field of view of the trainee 104. The augmented reality structure 102 overlays the virtual environment 103 on the field of view of the trainee 104. The visual overlays placed by the augmented reality structure 102 over the field of view of the trainee 104 provide the trainee 104 with the guidance necessary to learn the dialysis procedures. The augmented reality structure 102 comprises an artificial intelligence device 121 and a virtual reality headset 122.

The artificial intelligence device 121 is an artificial intelligence device 121. The artificial intelligence device 121 is defined elsewhere in this disclosure. The artificial intelligence device 121 forms the tactical AI structure that generates the virtual environment 103. The artificial intelligence device 121 is an interactive structure that adapts to: a) the movements of the trainee 104 and the relative position of the simulated arm structure 101 relative to the trainee 104. The artificial intelligence device 121 generates an adapted virtual environment 103 that overlays the elements of the virtual environment 103 on the simulated arm structure 101.

The virtual reality headset 122 is a display device. The virtual reality headset 122 forms an interface with the artificial intelligence device 121. The artificial intelligence device 121 transmits an encoded signal to the virtual reality headset 122. The virtual reality headset 122 converts the encoded signal into a visual display of the virtual environment 103. The virtual reality headset 122 senses the position of the simulated arm structure 101 relative to the trainee 104. The virtual reality headset 122 transmits the position of the simulated arm structure 101 relative to the trainee 104 such that the artificial intelligence device 121 can continuously update the positions of the virtual environment 103 relative to the trainee 104. The virtual reality headset 122 is a transparent display. The virtual reality headset 122 is designed such that the physical environment surrounding the trainee 104 is visible simultaneously with the virtual environment 103.

The virtual environment 103 are the visual overlays that are presented by the augmented reality structure 102 to the trainee 104. The virtual environment 103 presents the visual stimuli that are perceived within the field of view of the trainee 104. The virtual environment 103 assists the trainee during the training process. The virtual environment 103 comprises a therapeutic device overlay 131 and a fistula overlay 132.

The therapeutic device overlay 131 is a virtual image of the equipment that the trainee 104 works with during the insertion of the catheter. The therapeutic device overlay 131 provides the trainee 104 with access to the measured vital signs of the patient.

The fistula overlay 132 is an image of the fistula of the patient that is generated by the artificial intelligence device 121. The fistula overlay 132 is overlaid on the simulated skin structure 111 of the simulated arm structure 101 at the location that teaches the trainee 104 where the catheter should be inserted. The fistula overlay 132 can be removed from the virtual environment 103 as the trainee 104 gets better at locating the simulated fistula structure 112 during training.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Artificial: As used in this disclosure, the term artificial refers to a constructed or manufactured structure that imitates or substitutes a naturally occurring structure.

Artificial Consciousness: As used in this disclosure, artificial consciousness refers to an emergent property derived from a synergy between multiple strategic artificial intelligence systems that are operating simultaneously and independently. By emergent property is meant that the derived artificial consciousness displays properties that are not inherent to the processes of the underlying strategic artificial intelligence systems.

Artificial Intelligence: As used in this disclosure, artificial intelligence refers to a structure that is configured to perform tasks in a manner that simulates human intelligence. This disclosure assumes that an artificial intelligence system can be organized into one of two classes: a) tactical artificial intelligence system; and, b) strategic artificial intelligence system.

Artificial Intelligence Device: As used in this disclosure, an artificial intelligence device refers to a device (AI device) that is configured to perform tasks in a manner that simulates human intelligence. By simulating human intelligence is meant that: a) the AI device is autonomous; b) is capable of receiving inputs from and generating outputs into an operating environment; c) that the received inputs are processed through a utility function; d) that the utility function generates the outputs; e) that the generated outputs of the utility function are optimized in some fashion (such as the use of a maximum likelihood function); and f) the utility function is modified over time through the use of a feedback mechanism (often referred to as training).

Augmented Reality System: As used in this disclosure, an augmented reality system refers to a type of virtual reality system. In an augmented reality system, a virtual environment is presented to an individual such that: a) the individual maintains a sensory access to environmental sensory stimuli; while, b) a set of sensory stimuli generated through a virtual environment are presented (overlaid) to the individual; such that, c) the individual will simultaneously sense stimuli from both the virtual environment and the organic environment surrounding the individual. As an example, a visually oriented augmented reality can be presented to an individual such that: a) the individual maintains a field of view into the environment; while, b) a virtual environment is overlaid on the field of view; such that, c) the individual will simultaneously see both the virtual environment and the field of view. A heads up display is a simple example of an augmented reality system.

Cant: As used in this disclosure, a cant is an angular deviation from one or more reference lines (or planes) such as a vertical line (or plane) or a horizontal line (or plane).

Catheter: As used in this disclosure, a catheter is a flexible tube that is inserted into the body through which images may be captured and fluids may be introduced into or removed from the body. Endoscope is a synonym for catheter. A condom catheter is a tubular structure that is designed be worn over the penis of a patient. The condom catheter transports captured excretions away from the penis of the patient.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Consciousness: As used in this disclosure, consciousness refers to an emergent property derived from the synergy of multiple biochemical processes that are occurring simultaneously. By emergent property is meant that consciousness displays properties that are not inherent to the biochemical processes underlying consciousness. Examples of consciousness would include, but are not limited to, a body's awareness of its surrounding, a body's awareness of itself, an awareness that the body is perceiving their surroundings, the ability of a body to feel pain, and the inherent ability of a body to feel emotions.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Hypodermic Needle: As used in this disclosure, a hypodermic needle is a fluid transport structure that transports a cosmetic media or a pharmacologically active media into or under the skin of a patient.

Inelastic Nature: As used in this disclosure, an inelastic nature refers to a flexible structure that maintains its new shape after the flexible structure has been deformed.

Interior: As used in this disclosure, the interior is used as a relational term that implies that an object is contained within the boundary of a structure or a space.

Luer Taper: As used in this disclosure, a Luer taper is a standardized fitting that is used to interconnect two object such that a fluid can pass from one object to the second object. Luer tapers are commonly found in medical applications on syringes. In this scenario, the syringe fitted with a Luer taper enables the syringe to receive a hypodermic needle, a nozzle, or a tube as required. A Luer slip is a second standardized fitting that is similar in structure and function to the Luer taper.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Plunger: As used in this disclosure, a plunger is a hand tool that is used to clear a blocked pipe in a plumbing system. The plunger comprises a bulb formed from an elastomeric material and a handle. The handle manipulates the bulb such that the volume in the bulb changes in such a manner that pressure differentials are created within the plumbing system. The generated pressure differentials provided the force required to dislodge the material blocking the pipe.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Puppet: As used in this disclosure, a puppet is a three-dimensional figure resembling a human, animal, plant, or symbolic image.

Relaxed Shape: As used in this disclosure, a structure is considered to be in its relaxed state when no shear, strain, or torsional forces are being applied to the structure.

Roughly: As used in this disclosure, roughly refers to a comparison between two objects. Roughly means that the difference between one or more parameters of the two compared objects are not significantly different.

Simulation: As used in this disclosure, a simulation refers to an environment that imitates a physical process. The verb form of simulation is to simulate.

Strategic Artificial Intelligence System: As used in this disclosure, a strategic artificial intelligence system describes an artificial intelligence based structure that: a) maintains a memory (or record) of prior actions and environmental conditions; b) uses the maintained memory to anticipate a future stimulus such as the thoughts, intentions, and emotional responses of an external agent that the artificial intelligence based structure interacts with; and, c) appropriately incorporates the anticipated future stimulus into the current actions and the future actions of the artificial intelligence based structure before the anticipated future stimulus has occurred. The strategic artificial intelligence system is also referred to as a strategic AI system.

Syringe: As used in this disclosure, a syringe is a device that is used to measure fluids. In a medical setting, a syringe is used to inject fluids into a body or draw fluids from a body in a measurable manner. A syringe generally comprises a hollow cylindrical barrel and a plunger.

Tactical Artificial Intelligence System: As used in this disclosure, a tactical artificial intelligence system describes an artificial intelligence based structure that has limited memory capability. By limited memory capability is meant that the artificial intelligence based structure either: a) does not maintain a memory (or record) of prior actions and environmental conditions; or, b) does maintain a memory of prior actions and environmental conditions but that these memories are not incorporated into future actions taken by the artificial intelligence based structure. The future action is defined to be any action subsequent to the current action being taken by the artificial intelligence based structure. The current action is defined to be the action taken by the artificial intelligence based structure immediately after the creation of a memory (or record) by the artificial intelligence based structure. The tactical artificial intelligence system is also referred to as a tactical AI system.

Train: As used in this disclosure, to train means to teach a biological entity (or artificial biological entity) a desirable skill of behavior through the use of instruction, practice, and practical experience.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Virtual: As used in this disclosure, as used in this disclosure, the term virtual refers to a second device or process that for all practical purposes can replace the benefits provided by a first device or process. By for all practical purposes is taken to mean that the benefits provided by the second device or process need not exactly match the benefits provided by the first device or process.

Virtual Environment: As used in this disclosure, a virtual environment refers to the machine generated environment created by a virtual reality system.

Virtual Consciousness: As used in this disclosure, the term virtual consciousness means the incorporation of simulated emotional responses into a virtual biological organism for the purpose of generating a sentiment in a biological organism that the virtual biological organism is alive.

Virtual Reality System: As used in this disclosure, the term virtual reality refers to a machine generated environment (virtual environment) that is designed to interface with the senses of one or more individuals. This disclosure assumes that the individuals are living biological organisms. The virtual reality system comprises a collection of display devices, sensor, and transducers that simulate the physical interactions between the one or more individuals and the machine generated environment. A virtual reality system is generally, but not always, assumed to have complete control over the virtual environment presented to the individual.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dialysis training using artificial intelligence and augmented reality comprising:

a simulated arm structure, an augmented reality structure, and a virtual environment;

wherein the simulated arm structure is a puppet that simulates an arm;

wherein the augmented reality structure is the physical structure that overlays the virtual environment on the simulated arm structure;

wherein the simulated arm structure comprises a simulated skin structure that is an elastic structure formed to simulate the mechanical structure of skin and present the trainee with a barrier and a simulated fistula structure that is a mechanical structure and maintains a fluid flow and pressure and mounts in the interior of the simulated arm structure;

wherein the virtual environment comprises a therapeutic device overlay that is a virtual image of the equipment and is configured to work with the trainee during the insertion of the catheter and a fistula overlay that is an image of the fistula of the patient and provides the trainee with access to the measured vital signs of the patient;

wherein the fistula overlay is overlaid on the simulated skin structure of the simulated arm structure at the location that is configured to teach the trainee where the catheter is to be inserted.

2. The dialysis training using artificial intelligence and augmented reality according to claim 1 wherein the dialysis training using artificial intelligence and augmented reality uses a tactical artificial intelligence method to generate an augmented reality for the trainee.

3. The dialysis training using artificial intelligence and augmented reality according to claim 2 wherein a form factor of the simulated arm structure simulates the arm of a patient;

wherein the simulated arm structure forms a physical structure that simulates tactile portions of the insertion of the catheter structure.

4. The dialysis training using artificial intelligence and augmented reality according to claim 3 wherein the augmented reality structure forms the visual stimuli that integrates the virtual environment with a field of view of the trainee;

wherein the visual overlays placed by the augmented reality structure over the field of view of the trainee provide the trainee with the guidance necessary to learn the dialysis procedures.

5. The dialysis training using artificial intelligence and augmented reality according to claim 4 wherein the virtual environment are the visual overlays that are configured to be presented by the augmented reality structure to the trainee;

wherein the virtual environment presents a visual stimuli that are configured to be perceived within the field of view of the trainee;

wherein the virtual environment is configured to assist the trainee during the training process.

6. The dialysis training using artificial intelligence and augmented reality according to claim 5 wherein the simulated skin structure forms an exterior surface of the simulated arm structure;

wherein the simulated fistula structure mounts in an interior of the simulated arm structure.

7. The dialysis training using artificial intelligence and augmented reality according to claim 6 wherein the augmented reality structure comprises the artificial intelligence device and a virtual reality headset;

wherein the virtual reality headset forms an interface with the artificial intelligence device.

8. The dialysis training using artificial intelligence and augmented reality according to claim 7 wherein the artificial intelligence device forms a tactical ai structure that generates the virtual environment;

wherein the artificial intelligence device is an interactive structure that is configured to adapt to movements of the trainee and the relative position of the simulated arm structure relative to the trainee;

wherein the artificial intelligence device generates an adapted virtual environment that overlays the elements of the virtual environment on the simulated arm structure.

9. The dialysis training using artificial intelligence and augmented reality according to claim 8 wherein the artificial intelligence device transmits an encoded signal to the virtual reality headset;

wherein the virtual reality headset converts the encoded signal into a visual display of the virtual environment;

wherein the virtual reality headset is configured to sense the position of the simulated arm structure relative to the trainee;

wherein the virtual reality headset transmits the position of the simulated arm structure relative to the trainee such that the artificial intelligence device is configured to continuously updates the position of the virtual environment relative to the trainee;

wherein the virtual reality headset is a transparent display;

wherein the virtual reality headset is configured to be designed such that the physical environment surrounding the trainee is visible simultaneously with the virtual environment.

\* \* \* \* \*